US012156612B1

(12) United States Patent
Waymire

(10) Patent No.: US 12,156,612 B1
(45) Date of Patent: Dec. 3, 2024

(54) FOOD PRODUCT COOKING COVERING DEVICE

(71) Applicant: Nifty Home Products, Inc, Madison Lake, MN (US)

(72) Inventor: Katherine Amy Waymire, Minneapolis, MN (US)

(73) Assignee: Nifty Home Products, Inc, Madison Lake, MN (US)

( * ) Notice: Subject to any disclaimer, the term of this patent is extended or adjusted under 35 U.S.C. 154(b) by 20 days.

(21) Appl. No.: 17/697,361

(22) Filed: Mar. 17, 2022

(51) Int. Cl.
*A47J 36/06* (2006.01)
*A47J 36/02* (2006.01)

(52) U.S. Cl.
CPC ............... *A47J 36/06* (2013.01); *A47J 36/02* (2013.01)

(58) Field of Classification Search
CPC .................................. A47J 36/06; A47J 36/02
USPC ........................ 220/737, 739, 573.1; 215/392
See application file for complete search history.

(56) References Cited

U.S. PATENT DOCUMENTS

| | | | | |
|---|---|---|---|---|
| 5,169,025 A | * | 12/1992 | Guo | B65D 81/3876 215/393 |
| 8,579,133 B2 | * | 11/2013 | Marcus | B65D 81/022 D3/229 |
| 8,978,906 B2 | * | 3/2015 | Feeley | A61J 9/08 215/11.1 |
| 2004/0173625 A1 | * | 9/2004 | Jones | A47G 23/0216 220/739 |
| 2006/0186129 A1 | * | 8/2006 | Allnutt | B65D 81/3865 220/737 |
| 2007/0138217 A1 | * | 6/2007 | Hranilovich | A45F 5/00 190/102 |
| 2012/0228318 A1 | * | 9/2012 | Martin | A47G 23/0216 220/737 |
| 2019/0144170 A1 | * | 5/2019 | Mouler | B65D 43/0222 426/106 |
| 2021/0316976 A1 | * | 10/2021 | Selenberg | B67B 7/18 |

FOREIGN PATENT DOCUMENTS

WO WO-2020161755 A1 * 8/2020 ............. A47J 36/06

* cited by examiner

*Primary Examiner* — J. Gregory Pickett
*Assistant Examiner* — Niki M Eloshway
(74) *Attorney, Agent, or Firm* — FERENCE & ASSOCIATES LLC

(57) ABSTRACT

An embodiment provides a device for covering a food product during cooking, including: a main body including a flexible material and having a thickness dimension, wherein the thickness dimension is less than ten millimeters, wherein the flexible material includes silicon; at least one protrusion on the main body protruding in a parallel direction with the thickness dimension of the main body, wherein the at least one protrusion includes a ball portion and a stem portion, wherein the ball portion is located on top of the stem portion and wherein the ball portion has a greater diameter than the stem portion; at least one receiving portion within the main body for receiving the at least one protrusion and having a diameter at least equal to the diameter of the stem portion of the protrusion; and at least one opening within the main body.

14 Claims, 3 Drawing Sheets

FOOD PRODUCT COOKING COVERING DEVICE

BACKGROUND

Preparing and cooking food takes time and effort. Thus, there are many kitchen devices that assist in making preparation and/or cooking of a food product easier, quicker, more efficient, more effective, and the like. For example, there are devices that assist in stripping herbs in a manner that reduces bruising to the herbs and is more efficient than traditional methods. As another example, there are devices that trim and decorate pie crusts in a single motion, thereby making the pie making process faster. There are even devices that hold butter, used oil or fat, and the like, which provide for a cleaner workspace. Such kitchen devices are helpful to a busy user, particularly in reducing the amount of time for preparing, cooking, serving, and even storing food products.

BRIEF SUMMARY

One embodiment provides a device for use in food preparation, including: a main body including a flexible material and having a thickness dimension; at least one protrusion on the main body having a diameter and protruding in a parallel direction with the thickness dimension of the main body; at least one receiving portion within the main body for receiving the at least one protrusion and having a diameter at least equal to the diameter of the protrusion; and at least one opening within the main body.

Another embodiment provides a system for use in food preparation, including: at least two devices for covering a food product during cooking, wherein each of the at least two devices includes: a main body including a flexible material and having a thickness dimension; at least one protrusion on the main body having a diameter and protruding in a parallel direction with the thickness dimension of the main body; at least one receiving portion within the main body for receiving the at least one protrusion of another of the at least two devices and having a diameter at least equal to the diameter of the protrusion; and at least one opening within the main body.

Another embodiment provides a device for covering a food product during cooking, including: a main body including a flexible material and having a thickness dimension, wherein the thickness dimension is less than ten millimeters, wherein the flexible material includes silicon; at least one protrusion on the main body protruding in a parallel direction with the thickness dimension of the main body, wherein the at least one protrusion includes a ball portion and a stem portion, wherein the ball portion is located on top of the stem portion and wherein the ball portion has a greater diameter than the stem portion; at least one receiving portion within the main body for receiving the at least one protrusion and having a diameter at least equal to the diameter of the stem portion of the protrusion; and at least one opening within the main body.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
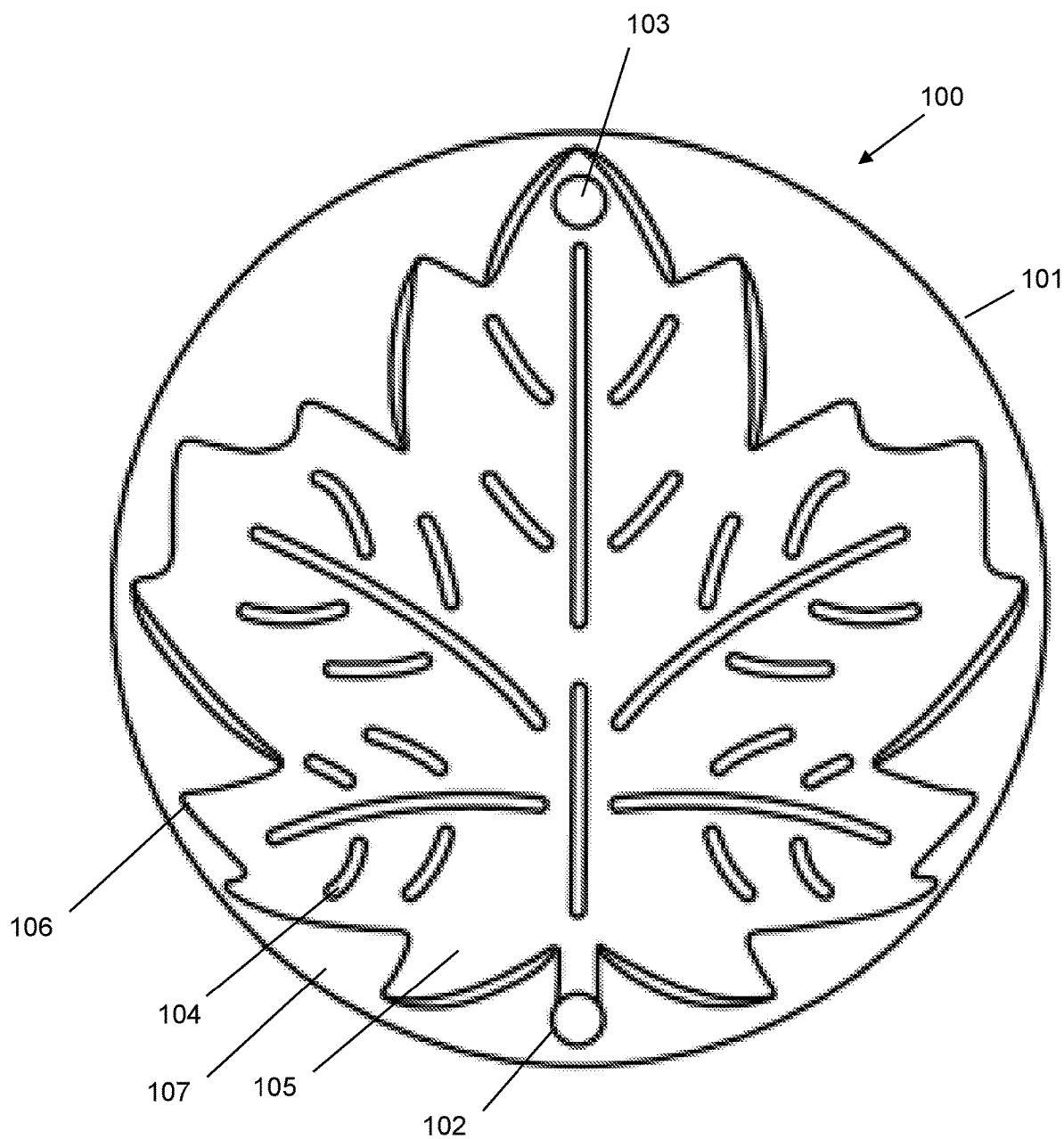
FIG. 1 illustrates a top view of an example device for covering a food product during cooking.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

With so many kitchen devices, one would think that there is a device for everything. However, while kitchen devices may be useful, these devices take up space and not all work as well as intended. Thus, a user is generally choosy about the devices that are purchased for use and storage in the kitchen. Generally, the user wants a device that performs its intended purpose well and that takes up as little space as possible. Additionally, a user may prefer a device can perform multiple functions or that includes accessories that allow the device to perform multiple functions. If a user is going to purchase a device, it generally needs to either perform much better than any other technique and/or make the task significantly easier and/or quicker to perform.

Some kitchen devices are used while a food product is cooking, for example, in the oven, on a stove top, in the microwave, and the like. Roasting food products, for example, chicken, turkey, beef, and the like, is a popular way of cooking these food products. However, when roasting large pieces of meat, for example, whole turkeys, whole chickens, large roasts, and the like, different portions of the meat cook at different rates. For example, the skin or outermost layer of the food product cooks faster than the center of the food product. Thus, a preparer of the food product may use an object to cover the food product to prevent the outermost layer from overcooking by the time the center of the food product is at a desired temperature. The most common object utilized by preparers is a piece of aluminum foil which is placed over and effectively molded to the food product. The aluminum foil assist in preventing the outermost layer from overcooking.

However, one problem with the use of aluminum foil is that it falls off the food product easily, particularly when the aluminum foil has to be moved to baste the food product, check the temperature of the food product, check the doneness or appearance of the outermost layer, and the like. Additionally, once the aluminum foil is moved, it is difficult to get the aluminum foil placed back in the position the preparer desires, particularly because the food product is hot. Aluminum foil is also only usable for a single use. Once the aluminum foil is molded over the food product, it becomes dirty and uncleanable and wrinkled and unable to be flattened, thereby preventing it from being used again.

Accordingly, the described device provides a device that is utilized during the cooking process of a food product. The device is placed over the food product so that the outermost layer of the food product does not cook too quickly and overcook as compared to other portions of the food product. Instead of aluminum foil which is a single use product, the described device is able to be reused since it is washable and does not retain a particular form. The device has a main body that is made of a flexible material and that has a thickness dimension. The thickness of the material may be of a thickness to allow the device to drape over a food product. The device may also include a protrusion on the main body that protrudes up from the main body. In other words, the protrusion may protrude in a parallel direction with the thickness dimension of the main body. The main body also has a receiving portion within the main body for receiving the protrusion. The protrusion and receiving portion may be used in conjunction to attach multiple devices together in the event that the food product is larger than a single device. The device also includes one or more openings in the main body which may allow for the insertion of a thermometer into the food product without having to remove or move the device from the food product.

The illustrated example embodiments will be best understood by reference to the figures. The following description is intended only by way of example, and simply illustrates certain example embodiments.

Figure 2:
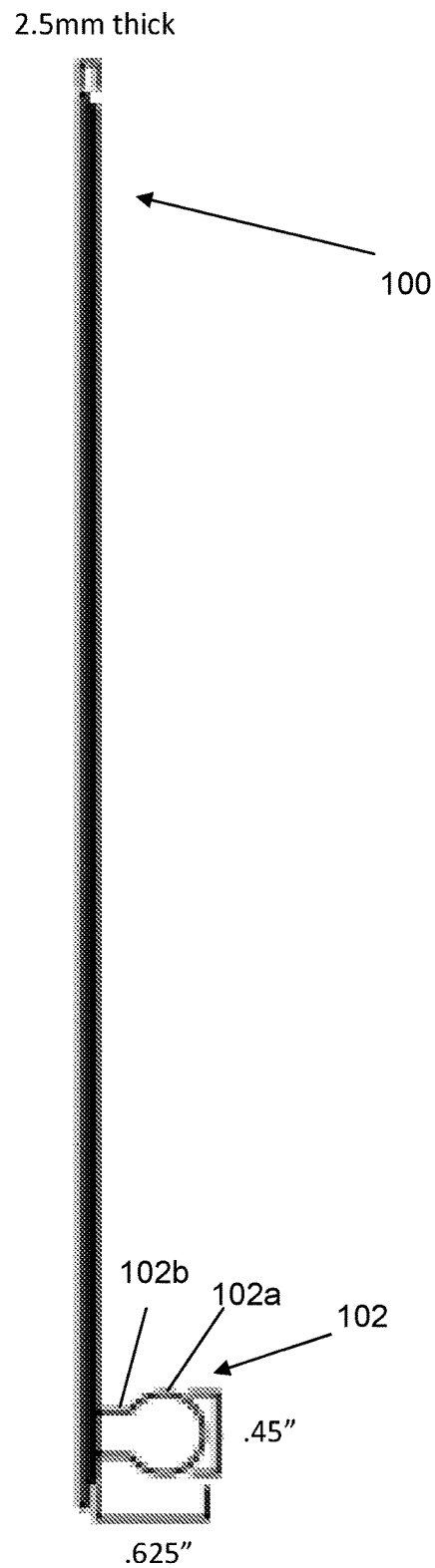
FIG. 2 illustrates a side view of an example device for covering a food product during cooking.

FIG. 1 illustrates a top view of an example device 100 for use in food preparation. FIG. 2 illustrates a side view of the example device 100 illustrated in FIG. 1. The main example application of the device that will be discussed herein is as a food product covering device during cooking of the food product. A more specific example is as a roasting shield for a chicken or turkey during roasting of the chicken or turkey. However, it should be understood by one skilled in the art that the described device could be used in other food preparation applications. For example, the described device could be used as a hot item holder, a dish cover, or any other application where a flexible device could be used.

The device 100 includes a main body 101 that is made of a flexible material. The flexible material may be silicone, thin and/or flexible plastic, or any other type of material that is flexible and does not degrade during the application of heat, such as roasting heats. The material is selected to have properties that allow the device to form to the shape of the food product while in use, but also is not too floppy. Thus, the hardness of the device may be selected to balance the ability of the device to mold to the food product while not being too floppy. In addition to the hardness value, the device has a thickness dimension that is not too thick so that the device does not mold to the food product, but that is thick enough to not be too floppy. A non-limiting example overall thickness dimension, as illustrated in FIG. 2, may be 2.5 millimeters. While dimensions are described herein, these are merely example dimensions as other dimensions can be utilized. For example, any thickness less than 10 millimeters may be utilized. Additionally, thicknesses more than 10 millimeters may be utilized depending on the material. However, the selected thickness should still allow the device to mold over the food product. Thus, it should be understood that the dimensions described herein are not intended to limit this disclosure to the explicit dimensions described. In the example illustration of FIG. 1 and FIG. 2, the device includes multiple layers that together make up the 2.5 millimeters illustrated in FIG. 2.

The device may be a single layer or may be made of multiple layers. For example, the device illustrated in FIG. 1 and FIG. 2 has multiple layers. The device has a base layer 107 that acts as a foundation for the other layers. In the example illustrated in FIG. 1 and FIG. 2, the base layer is 1 millimeter thick. The device example illustrated in FIG. 1 and FIG. 2 also includes a strengthening layer 106. The strengthening layer 106 is used to strengthen the portions of the device 100 located around the openings 104 (discussed in more detail further herein) in the device. Thus, the strengthening layer 106 is intended to assist in preventing the device from tearing around openings 104 in the device. The thickness of the strengthening layer 106 may be 0.5 millimeters. Thus, the strengthening layer in addition to the base layer results in a thickness of 1.5 millimeters.

The device example illustrated in FIG. 1 and FIG. 2 also includes a decorative layer 105 that creates a design within or on the device. The decorative layer 105 may be a layer that imparts a design on the device. The decorative layer 105 illustrated in FIG. 1 is of a leaf design. However, any design could be utilized. For example, the design may be a company logo, a personalized picture, a geometric shape, an abstract design, or another other design that a user may want. In addition to the design, the device may be colored, have multiple colors, or the like. As part of the design, the device 100 may include one or more openings 104 that are incorporated into the design. As illustrated in FIG. 1, the device 100 includes openings that appear to be the ribs of the leaf. Thus, openings 104 may be included that accentuate or complement the design of the device 100.

The main body may be of a size that allows the device to cover a food product or a portion of the food product during roasting. As a non-limiting example, if the main body has a circular shape, the diameter of the device may be 8 inches. It should be understood that other dimensions are possible and may be dependent on the application. Thus, different size devices may be used for different food products. For example, an eight-inch diameter device may be used with a chicken and a fifteen-inch diameter device may be used with a turkey. As another example, a six-inch diameter device may be used with a roast. Additionally, the device may be of a shape other than a circle. For example, the device may have an oval shape, a rectangular shape, a square shape, an octagonal shape, or the like. Like the size, different shapes may be preferred in different applications. For example, a rectangular shape may be preferred for a prime rib or pork rib roasting application. In the case that the device has a squarer shape, one of the linear dimensions might be at least four inches.

The device 100 includes at least one protrusion 102 on the main body 101. The at least one protrusion 102 may have a diameter. While diameter implies that the protrusion may be of a circular shape, it should be understood that the protrusion may be of a different shape, for example, a more rectangular or square shape, a triangular shape, or the like. In the case that the protrusion has a shape other than a circular, oval, or other shape normally associated with a diameter dimension, the diameter dimension can be equated to a linear dimension of the shape of the protrusion. The diameter or linear dimension being the dimension going across the middle of the protrusion. Additionally, the protrusion may have multiple diameters. For example, and as illustrated in FIG. 2, the protrusion may have a ball portion 102a and a stem portion 102b, where the ball portion 102a is located on top of the stem portion 102b. As illustrated in FIG. 2, the ball portion 102a has a greater diameter than the stem portion 102b. This protrusion design allows for the device to hold when the protrusion 102 is placed into a receiving portion 103.

The protrusion 102 is in a perpendicular direction to the main body 101 of the device 100. In other words, the protrusion 102 protrudes in a parallel direction with the thickness dimension of the main body. Stated differently, the protrusion 102 sticks up from the main body 101 of the device 100. The relationship of the protrusion 102 with the main body 101 is illustrated well in FIG. 2. In FIG. 2, the protrusion 102 has a height dimension of 0.625" and a ball diameter of 0.45". The protrusion 102 may be integral to the main body 101. In other words, the protrusion 102 may be manufactured with the main body 101. Alternatively, the protrusion 102 may be manufactured after the main body 101 and then coupled to the main body 101. The device 100 may include more than one protrusion 102. Multiple protrusions 102 may be located at different locations on the main body 101, for example, on opposing sides, at predetermined distances around the perimeter of the device 100, or the like.

The device 100 may include at least one receiving portion 103 within the main body 101. The receiving portion 103 is designed to receive a protrusion 102. Thus, the receiving portion 103 has a diameter equal to the diameter of the protrusion 102. In the case that the protrusion 102 includes more than one diameter, for example, on a ball-and-stem protrusion, if the protrusion has a graduated diameter, or the like, the receiving portion may be equal to the smallest diameter. Using the example illustrated in FIG. 1 and FIG. 2, the diameter of the receiving portion 103 may be equal to or slightly larger than the diameter of the stem of the protrusion 102. Thus, when the protrusion 102 is inserted into the receiving portion 103, the protrusion 102 may lock into the receiving portion 103. However, the receiving portion 103 is designed so that the protrusion 102 can be removed from the receiving portion 103 without tearing or damaging the device 100. As with the protrusion 102, the device may include more than one receiving portion 103 that may be at different locations on the main body 101.

The device 100 may include one or more openings 104 in the main body 101. While these openings 104 may be integral to the design included on the device, as discussed herein, the openings may also serve a functional purpose. As one example, the openings may be used to place a thermometer in the food product without having to remove the device from the food product and without damaging the device 100. The openings may also help release steam or moisture from the food product which could result in a soggy or floppy food product. Thus, the openings may allow an escape for the steam or moisture which results in a crisper skin or outer layer of the food product. As shown in FIG. 1 the device 100 may include many different openings 104. However, the device 100 may also include a single opening 104. The size and shape of the openings 104 can vary.

Due to the inclusion of the protrusion(s) 102 and the receiving portion(s) 103, more than one device 100 can be connected together. Being able to connect two or more devices 100 together allows the user to make a larger overall device 100 that could be used in applications with larger food products. For example, if the device 100 is of a size that is designed for use with a chicken or beef roast, connecting multiple devices 100 together allow the combined device 100 to be used on a larger food product like a turkey.

Figure 3:
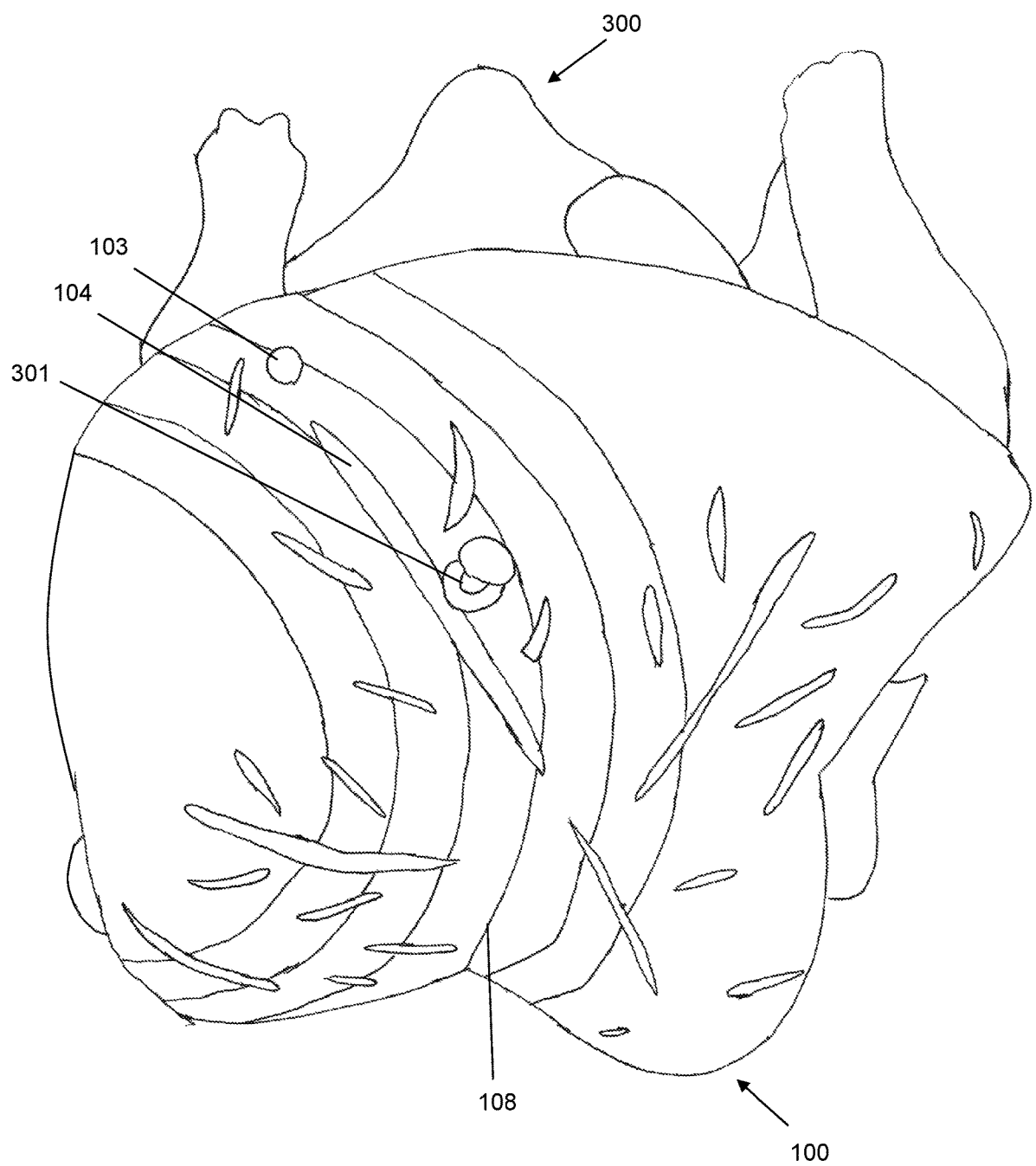
FIG. 3 illustrates an example of the device for covering a food product during cooking in use.

FIG. 3 illustrates an example of the described device in use on a food product. In this example, the device 100 has been placed on a chicken 300. A thermometer 301 has been placed through one of the openings in the device 100. As illustrated in this example, the device 100 has been placed over and covers the breast portion of the chicken 300. The device 100 may also include other useful features, for example, measuring lines 108, helpful cooking hints, cooking temperatures, and/or the like. Additionally, the material that is chosen for the device 100 may have properties that are useful. For example, the material may be a color changing material that changes with the application of heat. The color changing may provide an indication of how hot the food product is, how hot the device 100 is, and/or the like. Also, the color changing or design changing properties may change to a different design when heat is applied. For example, when cool the device may have a first design and when heated the device may have a second design.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device for use in food preparation, comprising:
   a main body comprising a flexible material and having a thickness dimension, wherein the main body comprises a plurality of layers, wherein one of the plurality of layers comprises a base layer made of the flexible material and that is a foundation for other of the plurality of layers, wherein a second of the plurality of layers comprises a strengthening layer made of the flexible material and that strengthens portions of the main body located around at least one opening, and wherein a third of the plurality of layers comprises a decorative layer made of the flexible material and that imparts a design on the main body, wherein the decorative layer partially covers the main body;
   at least one protrusion on the main body and produced from the flexible material, the at least one protrusion having a diameter and protruding in a parallel direction with the thickness dimension of the main body;
   at least one flexible receiving portion within the main body that stretches for receiving the at least one protrusion and having a diameter at least equal to the diameter of the protrusion; and the at least one opening within the main body, wherein the at least one opening is integrated into the design.

2. The device of claim 1, wherein the main body comprises at least one linear dimension greater than four inches.

3. The device of claim 1, wherein the at least one protrusion comprises a ball portion and a stem portion, wherein the ball portion is located on top of the stem portion and wherein the ball portion has a greater diameter than the stem portion, wherein the ball portion comprises a substantially spherically shape.

4. The device of claim 3, wherein the diameter of the at least one receiving portion is less than the diameter of the ball portion and at least equal to a diameter of the stem portion.

5. The device of claim 1, wherein the thickness dimension is less than ten millimeters.

6. The device of claim 1, wherein the flexible material comprises silicone.

7. The device of claim 1, wherein the at least one protrusion is manufactured as a single piece with the main body.

8. The device of claim 1, wherein the at least one protrusion has a plurality of diameters that are graduated and wherein the diameter of the at least one receiving portion is equal to the smallest diameter of the at least one protrusion.

9. A system for use in food preparation, comprising:
at least two devices for covering a food product during cooking, wherein each of the at least two devices comprises:
a main body comprising a flexible material and having a thickness dimension, wherein the main body comprises a plurality of layers, wherein one of the plurality of layers comprises a base layer made of the flexible material and that is a foundation for other of the plurality of layers, wherein a second of the plurality of layers comprises a strengthening layer made of the flexible material and that strengthens portions of the main body located around at least one opening, and wherein a third of the plurality of layers comprises a decorative layer made of the flexible material and that imparts a design on the main body, wherein the decorative layer partially covers the main body;
at least one protrusion on the main body and produced from the flexible material, the at least one protrusion having a diameter and protruding in a parallel direction with the thickness dimension of the main body;
at least one flexible receiving portion within the main body that stretches for receiving the at least one protrusion and having a diameter at least equal to the diameter of the protrusion; and
the at least one opening within the main body, wherein the at least one opening is integrated into the design.

10. The system of claim 9, wherein each main body comprises at least one linear dimension greater than four inches.

11. The system of claim 9, wherein each of the at least one protrusions comprises a ball portion and a stem portion, wherein the ball portion is located on top of the stem portion and wherein the ball portion has a greater diameter than the stem portion, wherein the ball portion comprises a substantially spherically shape.

12. The system of claim 9, wherein the flexible material comprises silicone.

13. The system of claim 9, wherein the at least one protrusion is manufactured as a single piece with the main body.

14. A device for covering a food product during cooking, comprising:
a circular main body comprising a flexible material and having a diameter of at least six-inches and a thickness dimension less than ten millimeters, wherein the flexible material comprises silicone, wherein the main body comprises a plurality of layers, wherein one of the plurality of layers comprises a base layer made of the flexible material and that is a foundation for other of the plurality of layers, wherein a second of the plurality of layers comprises a strengthening layer made of the flexible material and that strengthens portions of the main body located around at least one opening, and wherein a third of the plurality of layers comprises a decorative layer made of the flexible material and that imparts a design on the main body, wherein the decorative layer partially covers the main body;
at least one protrusion is manufactured as a single piece with the main body and is located on the main body and produced from the flexible material, the at least one protrusion protruding in a parallel direction with the thickness dimension of the main body, wherein the at least one protrusion comprises a ball portion and a stem portion, wherein the ball portion is located on top of the stem portion and wherein the ball portion has a greater diameter than the stem portion;
at least one flexible receiving portion within the main body that stretches for receiving the at least one protrusion and having a diameter at least equal to the diameter of the stem portion of the protrusion, wherein the diameter of the ball portion of the at least one protrusion is greater than the diameter of the at least one receiving portion; and
the at least one opening within the main body, wherein the at least one opening is integrated into the design.

\* \* \* \* \*